(12) United States Patent
M'Raihi

(10) Patent No.: US 7,347,366 B2
(45) Date of Patent: Mar. 25, 2008

(54) METHOD AND APPARATUS TO PROVIDE AUTHENTICATION USING AN AUTHENTICATION CARD

(75) Inventor: David M'Raihi, San Carlos, CA (US)

(73) Assignee: Verisign, Inc., Mountain View, CA (US)

( * ) Notice: Subject to any disclaimer, the term of this patent is extended or adjusted under 35 U.S.C. 154(b) by 0 days.

(21) Appl. No.: 11/376,678

(22) Filed: Mar. 14, 2006

(65) Prior Publication Data

US 2007/0215693 A1    Sep. 20, 2007

(51) Int. Cl.
*G06K 5/00* (2006.01)
(52) U.S. Cl. .................. 235/382; 235/380; 705/67
(58) Field of Classification Search ............. 235/382, 235/380, 49, 382.5; 705/67
See application file for complete search history.

(56) References Cited

U.S. PATENT DOCUMENTS 5,712,627 A * 1/1998 Watts .................. 340/5.81

2006/0031174 A1* 2/2006 Steinmetz .................. 705/67
2006/0266822 A1* 11/2006 Kelley et al. ............... 235/380

OTHER PUBLICATIONS

Securing What's At Risk: a Common Sense Approach to Strong Authenrication. Entrust, Inc. 2005.*

* cited by examiner

*Primary Examiner*—Michael G. Lee
*Assistant Examiner*—Allyson N Trail
(74) *Attorney, Agent, or Firm*—Blakely, Sokoloff, Taylor & Zafman, LLP; Judith A. Szepesi

(57) ABSTRACT

A method and apparatus to provide authentication. The method comprising sending a challenge to a user to be authenticated, the challenge including a reference on a card issued to the user and receiving a user-supplied value purported by the user to be associated with the reference on the card issued to the user. The method further comprising accessing a secret key associated with the card issued to the user and generating a password using a function F of the secret key and the reference. The method further comprising mapping the function F to a value in an alphabet and authenticating the user by comparing the value in the alphabet to the user-supplied value.

21 Claims, 7 Drawing Sheets

Authentication Card 100

4536 3657 2352 7658

Card Number 120

| 1 | F | 5 | V | 9 | N |
|---|---|---|---|---|---|
| 2 | Q | 6 | I | 10 | S |
| 3 | P | 7 | D | 11 | W |
| 4 | T | 8 | E | 12 | L |

METHOD AND APPARATUS TO PROVIDE AUTHENTICATION USING AN AUTHENTICATION CARD

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND

1. Field

Embodiments of the present invention relate generally to the field of authentication. More particularly, embodiments of the present invention relate to a second factor used for authentication.

2. Description of the Related Art

Authentication is the process of determining whether someone or something is, in fact, who or what it is declared to be. In private and public computer networks (including the Internet), authentication is commonly done through the use of logon passwords. Knowledge of the password is assumed to guarantee that the user is authentic. Each user registers initially using an assigned or self-declared password. On each subsequent use, the user must know and use the previously declared password. The password is considered a first factor, because it is something the user knows that presumptively no one else knows.

Since passwords are vulnerable to clever hackers, more security can be provided by adding a second factor to the authentication. The second factor is generally something the user has (as opposed to something the user knows). Common second factors are credit cards, smart keys, and other similar objects. A second factor containing only one piece of information is relatively vulnerable. What is needed is a second factor containing information that can be generated systematically and verified efficiently while not consuming excessive memory at the authentication authority.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

The Authentication Card

One embodiment of the invention provides an authentication card as a second factor for authentication. One embodiment of such an authentication card is now described with reference to FIG. 1A. In one embodiment, the authentication card 100 may be a plastic card in the shape of a credit card or other similar shape that fits into most wallets. In other embodiments, the authentication card may be fabricated out of paper, cardboard, metal, or any other suitable material.

Figure 1A:
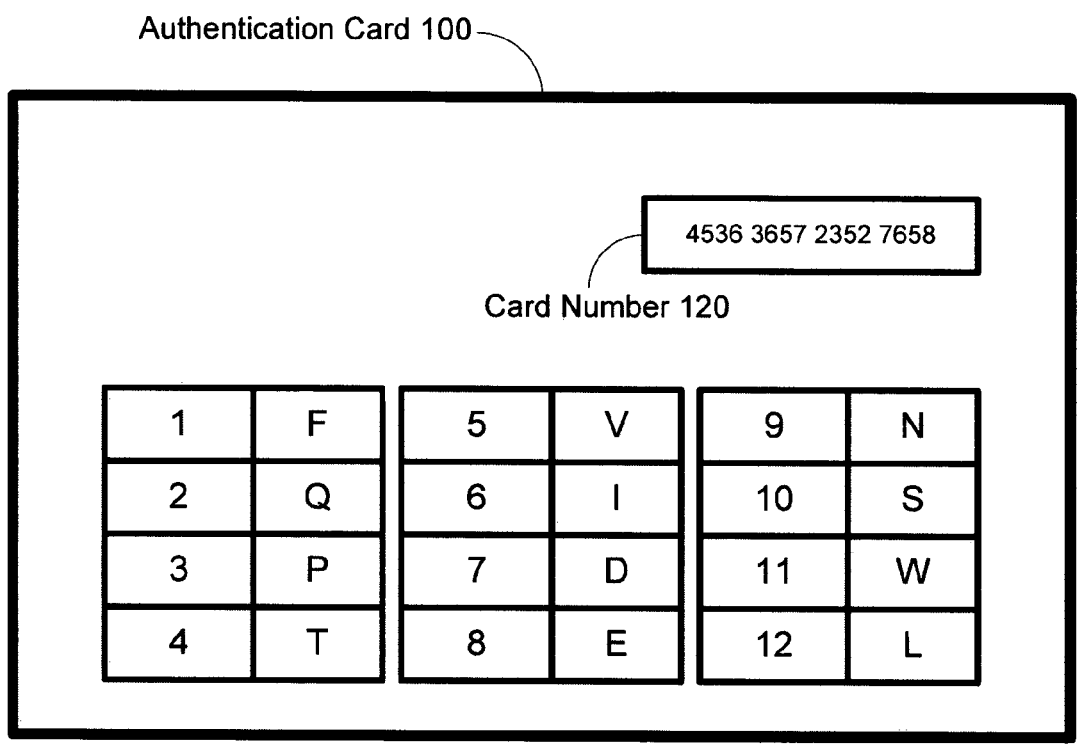
FIG. 1A is a block diagram illustrating an authentication card according to one embodiment of the present invention.

In one embodiment, the card is uniquely associated with a card number 120. For example, the card number 120 for authentication card 100 in FIG. 1A is 4536 3657 2352 7658. In one embodiment, the numbers on the card may include the card number itself (for identification purposes) and the method of computation. For example, the card number may be 4536 3657 2352 7658 A1. The number 4536 3657 2352 7658 is the card number for identification, while the A1 indicates the method computation. Various methods of computation may be utilized, as is described in more detail below. In one embodiment, the authentication card 100 also includes a set of reference/value pairs. A reference/value pair describes a reference and a value associated with the reference. For example, the authentication card 100 in FIG. 1A has twelve reference/value pairs, listed in order from top to bottom in three columns. Reference one has value F, reference two has value Q, and so on until reference twelve which has value L. While the Figures show the matrix and the card number on the same side, of course, they may be on opposite sides. In one embodiment, one side may include the card number and branding information while the other includes the matrix. In one embodiment, both sides can include parts of the matrix and/or card information. The distribution of information on the card itself can be varied without affecting the underlying invention.

Figure 1B:
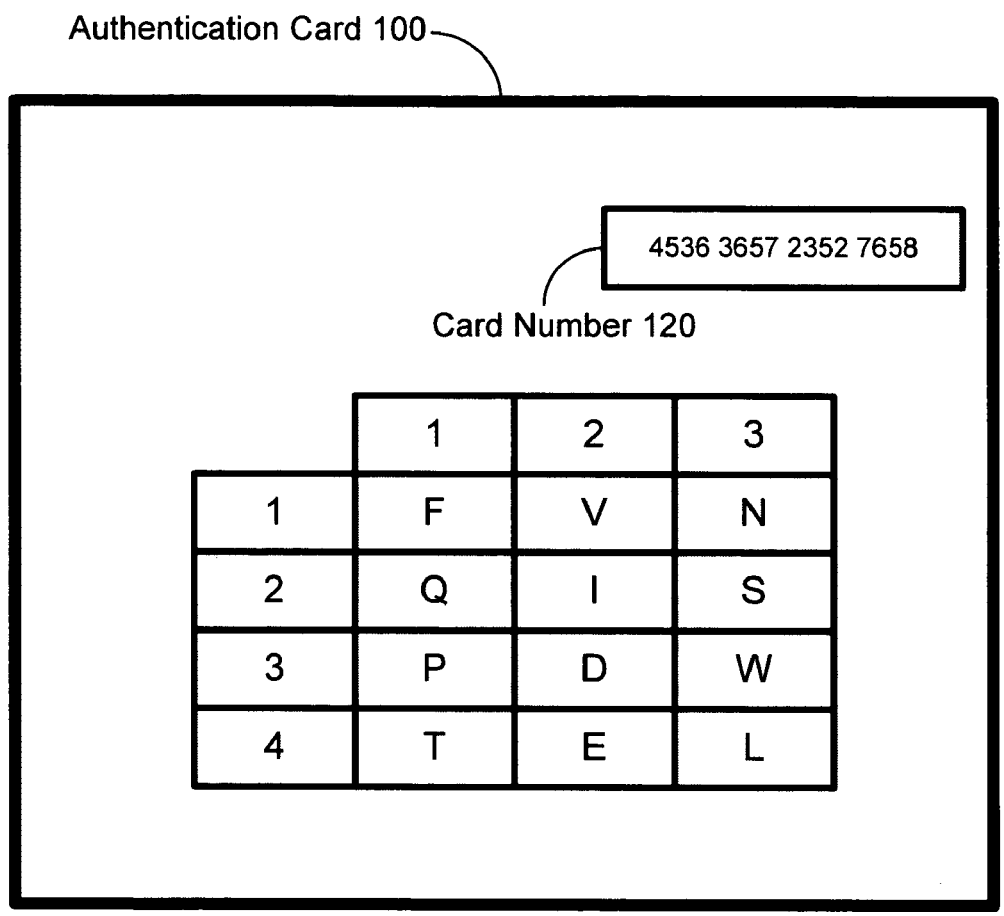
FIG. 1B is a block diagram illustrating an authentication card according to another embodiment of the present invention.

The reference/value pairs can be represented in numerous ways on the authentication card 100. Another way to represent reference/value pairs is shown in FIG. 1B. In FIG. 1B each reference is a cell in a grid, represented by its (row, column) coordinate. For example, in FIG. 1B, the reference (1,1) has value F, the reference (2,1) has value Q, and so on until reference (4,3) which has a value L. There are numerous other ways to represent reference value pairs including a list or a number of graphic devices such as color coding, shape coding, and so on. The concept of a reference/value pair, which is a reference and a value associated with the reference remains constant regardless of physical representation.

In one embodiment, the authentication cards issued by an entity (such as a bank or other organization that wishes to authenticate users) all have the same number of references and associated values. For example, the authentication cards 100 in FIGS. 1A and 1B have twelve references. In other embodiments, cards can have a variable number of references.

In one embodiment, the values associated with the references are generated methodically. In one embodiment, a secret key associated with the card is used to generate values for the reference numbers. In such an embodiment, when a card is being produced a secret key is generated and associated with the card. This association can be stored using the card number 112 associated with the authentication card 100.

In one embodiment, the value associated with each reference is generated by performing a one-way operation (e.g., a one-way hash function such as MD5 or SHA-1) on a combination of the secret key and the reference. In one embodiment the one way function used is the Hash-based One-Time Password (HOTP) algorithm, a publicly available algorithm published by the Open Initiative for Authentication (OATH). See Internet Engineering Task Force (IETF) HMAC OTP Draft 4, available at http://www.openauthentication.com. For example, using the authentication card 100 in FIG. 1A, the value associated with reference 6 would be HOTP (K, 6), where K is the secret key and the arguments of the hash function are concatenated. In the example of FIG. 1A, the resulting hash would be mapped to an alphabet resulting in "I."

The HOTP algorithm results in a 6-digit code, and is thus able to support any alphabet up to 999,999 "letters," or members. Other one-way functions can support larger or smaller alphabets. In the examples shown in FIGS. 1A and 1B, a standard A-Z alphabet is shown. However, any alphabet could be used, including characters, hexadecimal and decimal numerals, or any other symbols. In one embodiment all possible values in the alphabet used can be represented using a standard QWERTY keyboard.

Another example of using the HOTP algorithm to generate the reference-value pairs is now given with reference to FIG. 1B. The x-y coordinates of a cell can be combined with the secret key to give the value. For example cell (2,3) can be mapped as HOTP (K, 23). In this example, the x-y coordinates are simply concatenated, which produces a unique reference for each cell. The x-y coordinates may be combined in some other way, such as multiplication, although multiplication in particular will not produce unique references.

Authentication System

Figure 2:
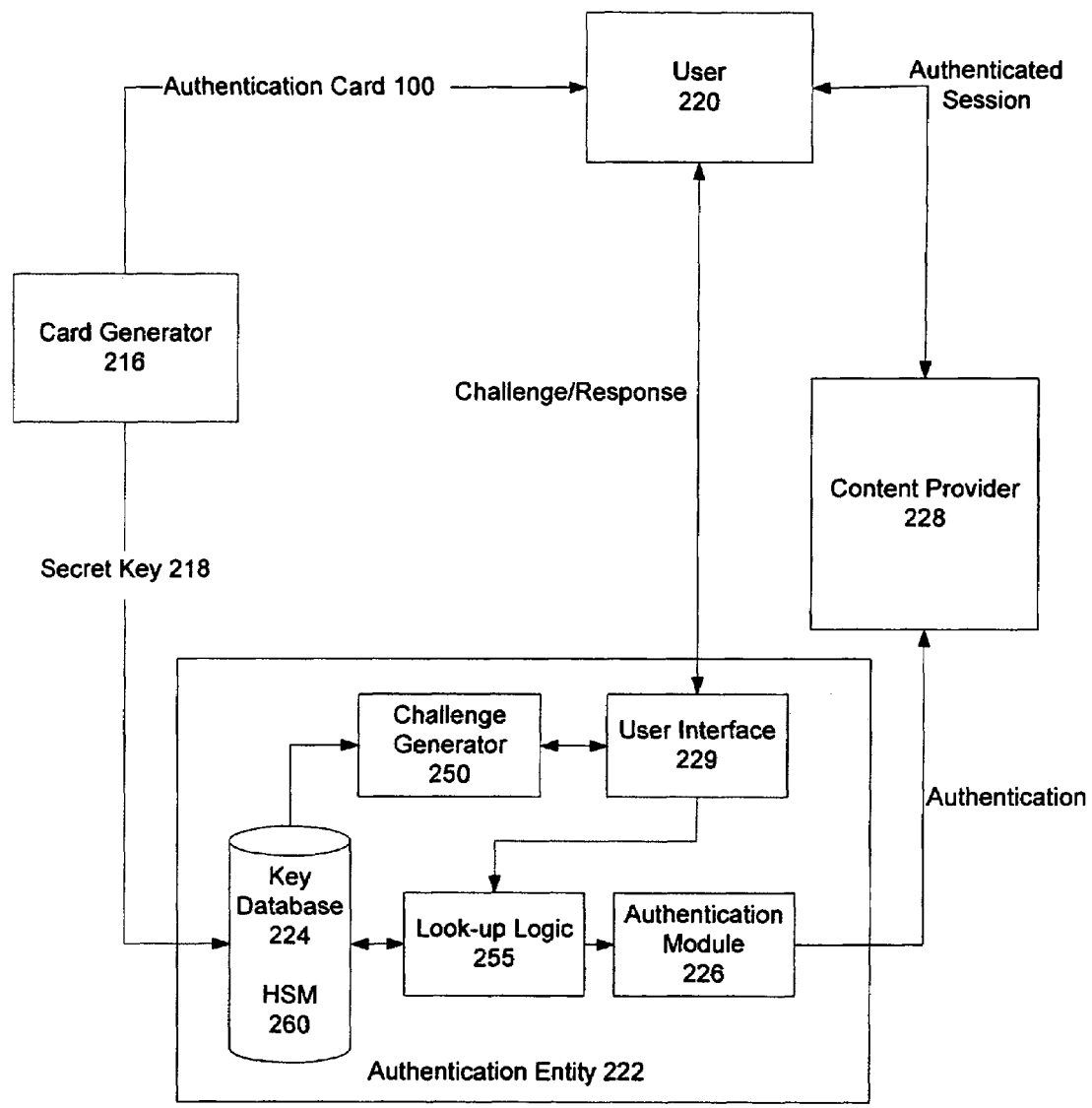
FIG. 2 is a flow diagram illustrating prior art prefetch optimization including static prefetch distance calculation.

With an understanding of some embodiments of an authentication card 100, one embodiment of an authentication system using the authentication card 100 is now described with reference to FIG. 2. FIG. 2 shows a card generator 216 that generates the authentication card 100 using the secret key 218. The card generator 216 may be a separate entity or company specializing in authentication or card printing and pressing. The card generator 216 may generate the secret key 218 itself, or may receive the secret key 218 from another entity.

In one embodiment, the secret key 218 is a random number generated by a random number generator. The secret key 218 can be created by any other means. One characteristic of the secret key is that it is not known to anyone outside of the card generator 216. The card generator 216 provides the authentication card 100 to a user 220 and the secret key 218 to an authentication entity 222. In one embodiment, the secret key 218 can be delivered on an secure physical medium, or via transmission on a secure encrypted communication channel. The card 100 can be provided first to an intermediary (such as a bank that will issue it to a customer), before coming into the possession of the user 220 who will use it for authentication.

The authentication entity 222 can be the entity requesting the authentication (e.g., the bank) or an entity or company specializing in authentication contracted by the entity requesting the authentication. In one embodiment, the secret key 218 is stored in a key database 224. In one embodiment, the secret key is associated with the card number of the authentication card it was used to generate. For example, the Key1 was used by the card generator 216 to generate card with card number 1234 5678 9101, then a record in the key database 224 will associate Key1 with card number 1234 5678 9101. In one embodiment, the key database is searchable by card number. In one embodiment, to protect the secret keys, the key database is stored on a hardware security module (HSM).

The authentication entity 222 also includes an authentication module 226. In one embodiment, the authentication entity 222 creates the challenges presented to the user 220 and evaluates the response received from the user 220. The authentication module 226 can contain a user interface 229 to communicate challenges to, and receive responses from the user 220. In another embodiment, a separate entity (such as the bank) interfaces with the user, and forwards the response to the challenge to the authentication entity 222. In other embodiments, one entity handles both user interface and authentication.

In one embodiment, a challenge generator 250 in the authentication entity 222 presents a challenge to the user 220 in the form of asking for the value associated with one or more references on the authentication card 100 issued to the user. For example, in one embodiment, in addition to the user's logon and password (first factor), the logon interface will also ask for the values associated with three randomly chosen references. Fewer or more references may be used.

For example, a user in possession of the authentication card 100 shown in FIG. 1A may be asked to provide the values of references 3 and 10. The correct answers for this example are P and S. A look-up logic 255 in the authentication entity 220 can look up the card number of the card 100 issued to the user 220 and access the key database 224 to access the secret key tied to the card number. The authentication module 226 can then regenerate the values asked for in the challenge using the algorithm used to generate the card. In this manner, the authentication module 226 can verify the possession of the card 100 by the user 220 without being in possession of all the reference-value pairs on the card 100. This enables efficient hardware protection of the information needed to verify the user 220.

If the authentication module successfully authenticates the user 220, then the authentication module 226 can send an authentication message to a content provider 228 that the user 220 wants to access. This communication may be implemented by a special content provider interface module that may be separate from the user interface 229. The content provider 228 may be a bank, an insurance company, and internet service provider or any other content or service provider that has users that the content provider 228 wishes to authenticate. The content provider 228 may be the same entity as the authentication entity 222, if the content provider 228 is handling the authentication in-house.

Upon receiving the authentication from the authentication module 226, the user 220 and the content provider 228 can engage in an authenticated session which may include online banking, web surfing, gaming or any other content or service provided. If authentication is not successful, the authentication module 226 informs the content provider that authentication has failed in the authentication message. The user 220 is then considered not authenticated, and will not be allowed authenticated access to the content provider 228.

Challenge-Response Protocols

Figure 3:
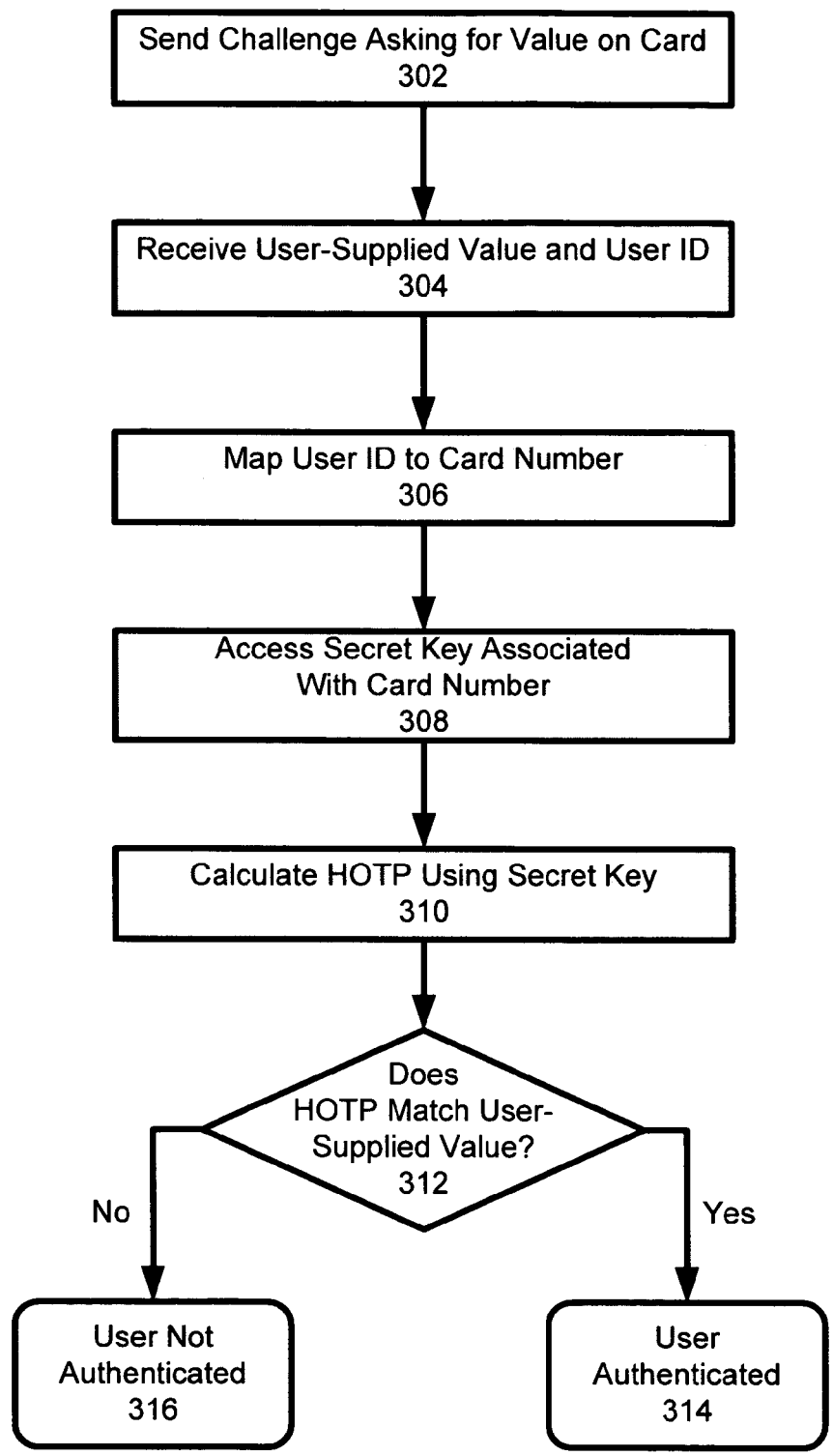
FIG. 3 is a flow diagram illustrating authentication processing according to one embodiment of the present invention.

One embodiment of a challenge-response protocol to authenticate a user having a second factor authentication card as described above is now set forth with reference to FIG. 3. The process described with reference to FIG. 3 can be performed, e.g., by the authentication entity 222 in FIG. 2.

In block 302, a challenge is sent to a user wanting access to some content or service. The challenge can be presented along with a standard login interface that asks for a user identifier (ID) or some other logon name and a password. For example, an email program typically asks for an email address (e.g. joe_smith@company.com) and a password.

In one embodiment, in addition to the usual logon screen, the logon also presents a challenge to identify one or more specific values on the authentication card issued to the user. The values may be identified by reference (such as a number or cell coordinates) or in some other manner. The challenge can ask for more than one value, however only one value is discussed for simplicity and ease of understanding. For example, a challenge asking for three values may ask a user for a user ID, a password, and the values of references 4, 9, and 12. For a user in possession of the card 100 shown in FIG. 1A, the correct values would be T, N, and L.

In block 304, a user-supplied value (or values in the case of multiple reference challenges) is received along with the user ID, in response to the challenge sent in block 302. For example, if the challenge asked for the value of reference 4, the user in possession of the card 100 in FIG. 1A may have entered T as the user-supplied value. However, a user not in possession of the card 100 (or a user making a mistake) may have entered a different (incorrect) value. The user-supplied value may have been entered by the user via the logon interface described above, or via some other challenge-response interface.

In block 306, the user ID is mapped to a card number of the authentication card issued to the user and bound to the user ID. The user ID to card number mapping may be contained in a customer table or customer database. In block 308, the card number is used to access the secret key associated with the card number. In one embodiment, the secret key was used to generate the reference-value pairs contained on the card, as described above.

In one embodiment, accessing the secret key can include searching a secure database using the card number as the search term. The database then includes the secret key associated with the card number. The secret key may be stored in encrypted form, and may need to be decrypted after being accessed before it can be used.

In block 310, the value associated with the reference asked for in the challenge sent in block 302 is calculated by calculating the HOTP of the concatenation of the secret key and the reference. Since, as described above, this algorithm was used to generate the value associated with the reference by the card generator, this calculation regenerates the value associated with the reference asked for in the challenge. In other embodiments, other algorithms can be used. So long as the algorithm used is the same algorithm used to initially generate the value on the card requested in the challenge, any suitable algorithm (such as hash algorithms) may be used.

In block 312, a determination is made as to whether the user-supplied value received in block 304 matches the HOTP calculated in block 310. Since the HOTP calculated in block 310 is the same as the original value of the reference printed on the card, if the user-supplied value matches the HOTP, then that is strong evidence that the user is in possession of the card associated to the user ID. Therefore, if there is a match in block 312, then, in block 314 the user is authenticated, and allowed access to the content or service requested by the user.

If, one the other hand, the HOTP and the user-supplied value do not match in block 312, then, in block 316 the user is not authenticated, and is not allowed access to the content or service requested by the user. If not authenticated, the account of the user ID may be alerted of the failed authentication, and the account may be locked to prevent further attack. In one embodiment, the user is given one or more additional chances to correctly respond to the challenge. In one embodiment, additional chances ask for the values associated with the same reference or references as the initial failed authentication attempt. In another embodiment, different references are used.

Figure 4A:
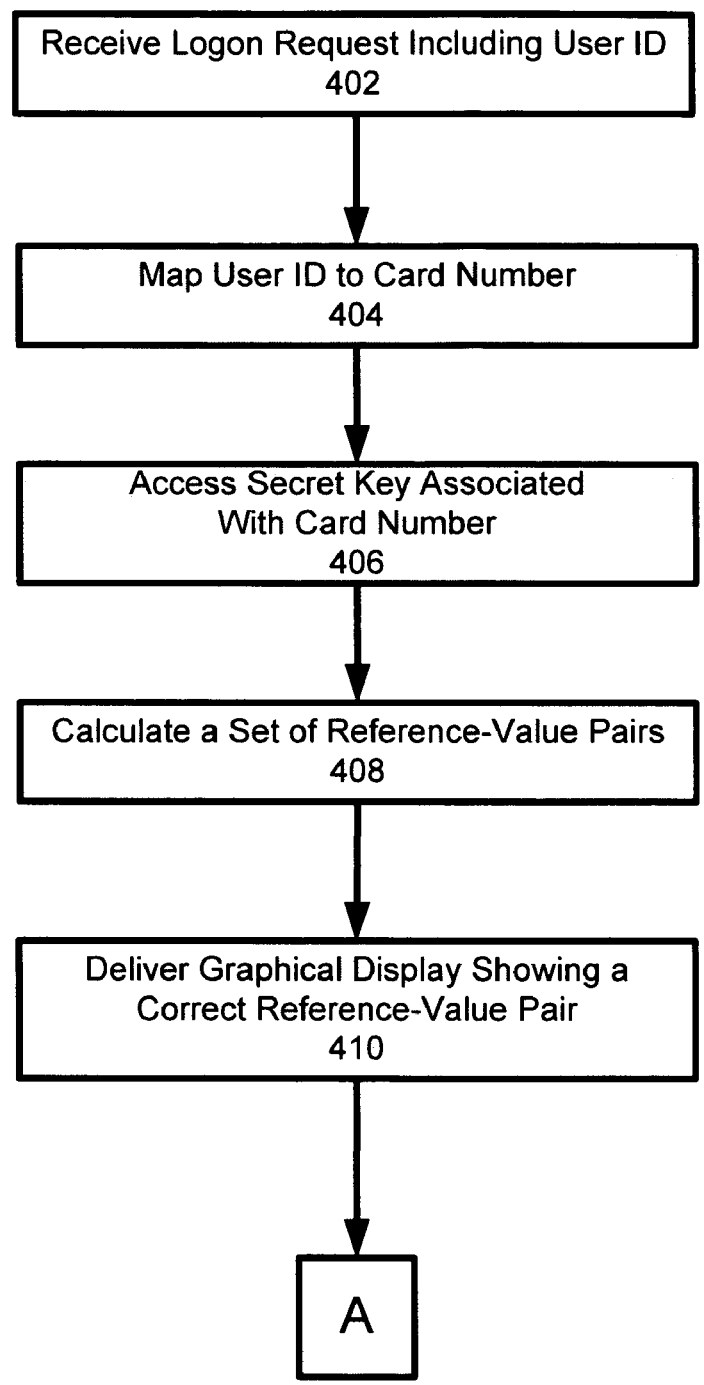
FIG. 4A is a flow diagram illustrating authentication processing according to another embodiment of the present invention.
Figure 4B:
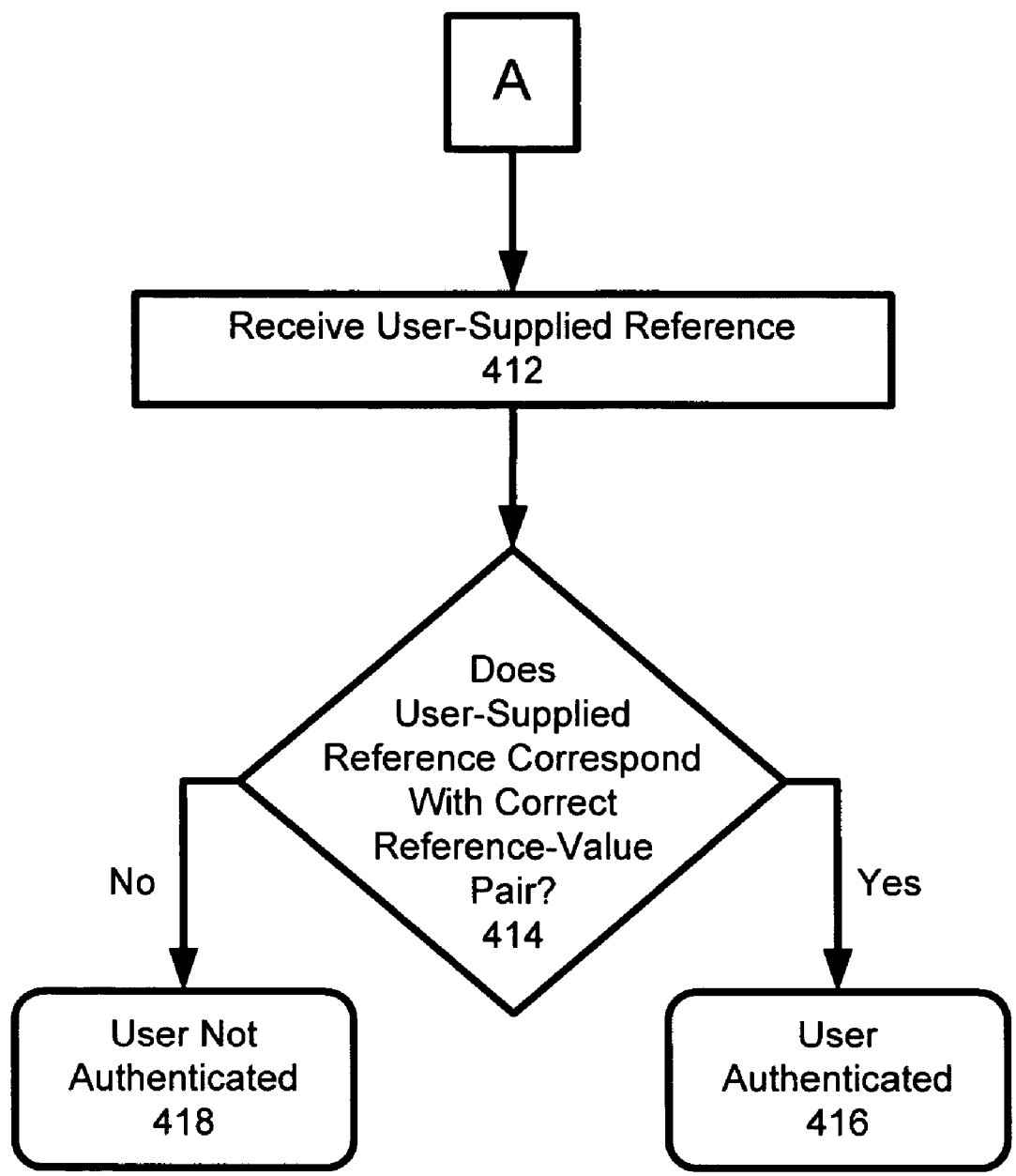
FIG. 4B is a flow diagram continuing the illustration of authentication processing according to one embodiment of the present invention.

One embodiment of a different challenge-response protocol using the authentication card is now described with reference to FIGS. 4A and 4B. In block 402, a logon request is received from the user, such as a logon to an email account or some other online content or service. The logon will include a user ID (such as an email address) as described above. In block 404 the user ID is mapped to a card number, and in block 406 the secret key associated with the card number is accessed.

In block 408 a set of reference-value pairs are calculated using the secret key. This can be done by calculating a set of HOTP using the secret key and a set of references, as described above. In another embodiment, the process and function used to generate the card is used to regenerate the values associated with a set of selected references. For example, if four references are selected (e.g., 2, 6, 9, and 11 of the card illustrated by FIG. 1A) then four reference-value pairs are calculated (e.g., 2-Q, 6-I, 9-N, and 11-W using the card illustrated by FIG. 1A).

In block 410, a graphical display is delivered to the user displaying one or more correct reference-pairs. In one embodiment, the other reference value pairs are purposefully displayed incorrectly. In the example above, reference 9 may be selected for correct display, resulting is a display showing 2-J, 6-O, 9-N, and 11-R. In another embodiment, more than one reference-value pair can be displayed correctly. Stated generally, a subset of the set of calculated reference-value pairs are displayed correctly and the remainder (all other reference-value pairs calculated) is displayed incorrectly. In one embodiment, the number of correct reference-value pairs is less than the number of incorrect reference-value pairs to make guessing the correct response more difficult.

In block 412, a user-supplied reference is received indicating which reference the user believes shows the correct associated value. In an embodiment where multiple reference value-pairs are displayed, multiple user-supplied references may be received. In this example, however, only one reference and value pair is displayed correctly, thus only one user-supplied reference is expected from the user in block 412. In one embodiment, the user can indicate the user's selection of the correct reference-value pair by clicking a mouse or cursor on a graphical representation of the reference-value pair. In this manner, the actual value of the correct reference value pair need not be transmitted between the user and the authentication entity resulting in additional security.

In block 414, a determination is made as to whether the user-supplied reference corresponds with the correct reference-value pair of block 410. In other words, did the user identify which reference-value pair displayed in the challenge in block 410 correctly matched a reference-value pair on the authentication card issued to the user? If, it is determined that the user-supplied reference (or references) does correspond with the correct reference-value pair, then in block 416 the user is authenticated. However, if it is determined that the user-supplied reference (or references) does not correspond with the correct reference-value pair, then in block 416 the user is not authenticated.

Example Computer System

Figure 5:
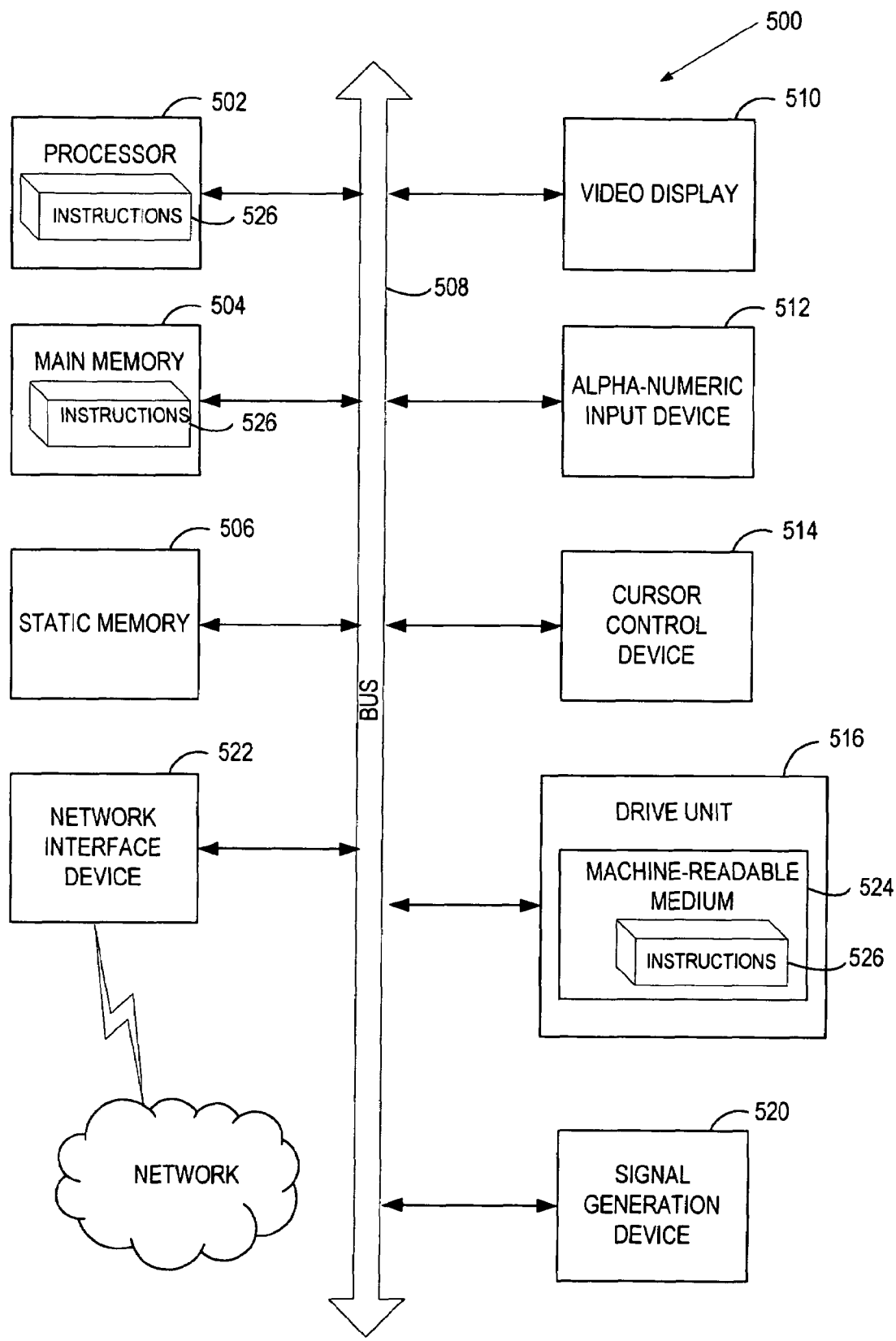
FIG. 5 is a block diagram illustrating an example computer system according to one embodiment of the present invention.

Various embodiments of the present invention have been described in the context of a compiler that generates code that is inserted into a program being compiled by the compiler. An example computer system on which such a compiler can be implemented in now described with reference to FIG. 5. Computer system 500 that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 500 includes a processor 502, a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a cursor control device 514 (e.g., a mouse), a disk drive unit 516, a signal generation device 520 (e.g., a speaker) and a network interface device 522.

The disk drive unit 516 includes a machine-readable medium 524 on which is stored a set of instructions (i.e., software) 526 embodying any one, or all, of the methodologies described above. The software 526 is also shown to reside, completely or at least partially, within the main memory 504 and/or within the processor 502. The software 526 may further be transmitted or received via the network interface device 522. For the purposes of this specification, the term "machine-readable medium" shall be taken to include any medium that is capable of storing or encoding a sequence of instructions for execution by the computer and that cause the computer to perform any one of the methodologies of the present invention. The term "machine-readable medium" shall accordingly be taken to included, but not be limited to, solid-state memories, optical and magnetic disks, and carrier wave signals.

General Matters

In the description above, for the purposes of explanation, numerous specific details have been set forth. However, it is understood that embodiments of the invention may be practiced without these specific details. In other instances, well-known circuits, structures and techniques have not been shown in detail in order not to obscure the understanding of this description.

Embodiments of the present invention include various processes. The processes may be performed by hardware components or may be embodied in machine-executable instructions, which may be used to cause one or more processors programmed with the instructions to perform the processes. Alternatively, the processes may be performed by a combination of hardware and software.

Embodiments of the present invention may be provided as a computer program product that may include a machine-readable medium having stored thereon instructions, which may be used to program a computer (or other electronic device) to perform a process according to one or more embodiments of the present invention. The machine-readable medium may include, but is not limited to, floppy diskettes, optical disks, compact disc read-only memories (CD-ROMs), and magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   sending a challenge to a user to be authenticated, the challenge including a reference on a card issued to the user, that was utilized in conjunction with a secret key to calculate a corresponding value on the card;
   receiving, from the user in response to the challenge, a user-supplied value from the card that is purported by the user to be associated with the reference on the card issued to the user;
   accessing a secret key associated with the card issued to the user;
   generating a code using a secure one-way function F of the secret key and the reference;
   mapping the code to a value in an alphabet; and
   authenticating the user by comparing the value in the alphabet to the user-supplied value from the card.

2. The method of claim 1, wherein the function F comprises a hash-based one-time password (HOTP).

3. The method of claim 1, further comprising receiving a user identifier from the user in response to the challenge, wherein accessing the secret key comprises mapping the user identifier to a card number associated with the user identifier, the card number being the card number of the card issued to the user.

4. The method of claim 1, wherein generating the code using the secure one-way function F comprises generating the function F using a concatenation of the secret key and the reference.

5. The method of claim 1, wherein the alphabet comprises a set of characters consisting of the English language alphabet A to Z and the Arab numerals 0 to 9.

6. The method of claim 1, wherein accessing the secret key comprises accessing the secret key used to generate all values on the card issued to the user when the card was originally created.

7. A method comprising:
   sending a challenge to a user to be authenticated, the challenge asking for information contained on a card issued to the user, wherein sending the challenge includes sending a set of references corresponding with a set of reference value pairs contained on the card;
   receiving a response to the challenge, the response comprising user-supplied information from the card, wherein the user-supplied information purports to be a set of values corresponding with the set of reference-value pairs;

accessing a secret key associated with the card issued to the user;

generating the information requested in the challenge using a secure one-way function of the secret key; and authenticating the user by comparing the generated information to the user-supplied information from the card in the received response.

8. The method of claim 7, wherein accessing the secret key comprises accessing a hardware security module (HSM).

9. The method of claim 7, wherein receiving the response to the challenge comprises receiving an indication of a correct reference-value pairs of a set of displayed reference-value pairs.

10. A method comprising:

sending a challenge to a user to be authenticated, the challenge asking for information contained on a card issued to the user;

receiving a response to the challenge the response comprising user-supplied information from the card;

accessing a secret key associated with the card issued to the user;

generating the information requested in the challenge using a secure one-way function of the secret key, wherein generating the information comprises calculating a secure one-way hash-based function of the secret key and at least a portion of the challenge; and authenticating the user by comparing the generated information to the user-supplied information from the card in the received response.

11. The method of claim 10, wherein the portion of the challenge comprises a reference contained on the card.

12. An authentication system comprising:

a user interface to send a challenge to a user to be authenticated, the challenge including a reference on a card, that was utilized in conjunction with a secret key to calculate a corresponding value on the card, issued to the user, and to receive a response to the challenge, the response comprising a user-supplied value from the card purported by the user to be associated with the reference on the card issued to the user;

a key database containing a secret key associated with the card issued to the user; and an authentication module to authenticate the user by generating the information requested in the challenge using a secure one-way function of the secret key and the reference to generate a code, mapping the code to a value, and comparing the value to the user-supplied information from the card in the received response for authentication.

13. The authentication system of claim 12, further comprising: a challenge generator to generate a challenge comprising a set of references corresponding to a set of reference-value pairs contained on the card.

14. The authentication system of claim 12, wherein accessing the key database comprises a hardware security module (FISM).

15. The authentication system of claim 12, wherein the authentication module generates the information by calculating a one-way hash of the secret key and at least a portion of the challenge.

16. The authentication system of claim 12, wherein the authentication module generates the information by calculating hash-based one-time password (HOTP) using a concatenation of the secret key and at least a portion of the challenge.

17. A method comprising:

sending a challenge to a user to be authenticated, the challenge comprising a display of a plurality of reference-value pairs;

receiving a response from the user indicating a first reference-value pair of the plurality of reference-value pairs that matches a reference-value pair printed on a card issued to the user;

accessing a secret key associated with the card issued to the user;

authenticating the user using the secret key and the received response with a secure one-way function of the secret key and at least a portion of the received response.

18. The method of claim 17, wherein authentication the user comprises generating the correct values for the plurality of reference-value pairs using the secret key, and determining whether the first reference-value pair identified by the user was correctly displayed in the challenge.

19. A method for a card-based second factor authentication, the method comprising:

requesting information from a user based on a reference-value pair from a card supplied to a user;

calculating a value of the reference-value pair based on a secure one-way function of a secret key associated with the card and a reference of the reference-value pair; and authenticating the user if the requested information from the card supplied to the user matches the calculated value.

20. The method of claim 19, wherein the user is required to enter a value of the reference-value pair when provided with the reference of the reference-value pair.

21. The method of claim 19, wherein the user is required to select a correct reference-value pair from a set including a plurality of incorrect reference-value pairs.

* * * * *